(12) United States Patent
Kim et al.

(10) Patent No.: US 10,477,613 B2
(45) Date of Patent: Nov. 12, 2019

(54) METHOD AND DEVICE FOR PERFORMING COMMUNICATION BY USING VIRTUAL TERMINAL IN INTER-VEHICLE COMMUNICATION SYSTEM

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/760,007

(22) PCT Filed: Sep. 5, 2016

(86) PCT No.: PCT/KR2016/009915
§ 371 (c)(1),
(2) Date: Mar. 14, 2018

(87) PCT Pub. No.: WO2017/047960
PCT Pub. Date: Mar. 23, 2017

(65) Prior Publication Data
US 2018/0255603 A1 Sep. 6, 2018

Related U.S. Application Data

(60) Provisional application No. 62/220,254, filed on Sep. 18, 2015.

(51) Int. Cl.
*H04W 24/10* (2009.01)
*H04W 76/10* (2018.01)
(Continued)

(52) U.S. Cl.
CPC ............ *H04W 76/25* (2018.02); *H04W 4/46* (2018.02); *H04W 8/24* (2013.01); *H04W 24/10* (2013.01);
(Continued)

(58) Field of Classification Search
CPC ....... H04W 76/25; H04W 4/46; H04W 76/11; H04W 76/10; H04W 8/24; H04W 24/10;
(Continued)

(56) References Cited

U.S. PATENT DOCUMENTS

2012/0064932 A1* 3/2012 Lim .................. H04W 4/06
455/509
2014/0233454 A1 8/2014 Speight et al.
2018/0234212 A1* 8/2018 Park .................. H04B 7/26

FOREIGN PATENT DOCUMENTS

| KR | 10-2015-0022240 A | 3/2015 |
| KR | 10-2015-0084224 A | 7/2015 |
| WO | WO 2015/102445 A1 | 7/2015 |

OTHER PUBLICATIONS

LG Electronics, "Potential enhancements for PC5-based V2V," 3GPP TSG RAN WG1 Meeting #82, R1-154290, Beijing, China, Aug. 24-28, 2015, pp. 1-4.

* cited by examiner

*Primary Examiner* — Marisol Figueroa
(74) *Attorney, Agent, or Firm* — Birch, Stewart, Kolasch & Birch, LLP

(57) ABSTRACT

The present specification can provide a method by which a terminal performing communication controls a virtual terminal. The method for controlling the virtual terminal can comprise the steps of: connecting with a base station; receiving a connection re-establishment command message from the connected base station; and registering or removing
(Continued)

the virtual terminal on the basis of the connection re-establishment command message.

10 Claims, 17 Drawing Sheets

(51) Int. Cl.
| | |
|---|---|
| *H04W 60/00* | (2009.01) |
| *H04W 76/25* | (2018.01) |
| *H04W 4/46* | (2018.01) |
| *H04W 76/11* | (2018.01) |
| *H04W 8/24* | (2009.01) |
| *H04B 7/0413* | (2017.01) |
| *H04W 88/02* | (2009.01) |
| *H04B 7/024* | (2017.01) |
| *H04B 7/0452* | (2017.01) |
| *H04B 7/0456* | (2017.01) |
| *H04W 8/26* | (2009.01) |

(52) U.S. Cl.
CPC ............ *H04W 76/10* (2018.02); *H04W 76/11* (2018.02); *H04B 7/024* (2013.01); *H04B 7/0413* (2013.01); *H04B 7/0452* (2013.01); *H04B 7/0469* (2013.01); *H04B 7/0486* (2013.01); *H04W 8/26* (2013.01); *H04W 60/00* (2013.01); *H04W 88/02* (2013.01)

(58) Field of Classification Search
CPC ....... H04W 8/26; H04W 88/02; H04W 60/00; H04B 7/024; H04B 7/0486; H04B 7/0469; H04B 7/0452; H04B 7/0413
See application file for complete search history.

(a) Control-plane protocol stack (b) User-plane protocol stack (a)

(b)

· event trigger due to serving cell Rx power reduction event trigger due to appearance of better cell

METHOD AND DEVICE FOR PERFORMING COMMUNICATION BY USING VIRTUAL TERMINAL IN INTER-VEHICLE COMMUNICATION SYSTEM

CROSS REFERENCE TO RELATED APPLICATIONS

This application is the National Phase of PCT International Application No. PCT/KR2016/009915, filed on Sep. 5, 2016, which claims priority under 35 U.S.C. 119(e) to U.S. Provisional Application No. 62/220,254, filed on Sep. 18, 2015, all of which are hereby expressly incorporated by reference into the present application.

TECHNICAL FIELD

The present invention relates to a wireless communication system, and more particularly to a wireless communication system applied to vehicle-to-vehicle (V2V) communication.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

In addition, recently, interest in a vehicular communication system has increased. More specifically, interest in a method of applying wireless communication technology and position tracking technology (global positioning system (GPS)) to a vehicle and providing a service such as vehicle diagnosis, theft detection, route guidance or traffic service provision to a driver who uses the vehicle in real time has increased. At this time, there is a need for methods of efficiently performing vehicular communication in consideration of the appearance and mobility of a vehicle and interference with another vehicle in a vehicular communication system.

DISCLOSURE

Technical Problem

An object of the present description is to provide a method and device for performing communication using a virtual user equipment (UE) in an inter-vehicle communication system.

An object of the present description is to provide a method by which a UE registers or removes a virtual UE under the control of a base station.

An object of the present description is to provide a method of registering or removing a virtual UE without affecting a network configuration such as a bearer.

Technical Solution

According to an embodiment of the present invention, a method by which a user equipment (UE) performing communication in an inter-vehicle communication system controls a virtual UE may include: performing connection with a base station; receiving a connection reconfiguration command message from the connected base station; and registering or removing the virtual UE on the basis of the connection reconfiguration command message.

In addition, according to an embodiment of the present invention, a UE performing communication by controlling a virtual UE in an inter-vehicle communication system may include: a transceiver module for transmitting/receiving information to/from an external device; and a processor for controlling the transceiver module. Here, the processor may be configured to perform connection with a base station, to receive a connection reconfiguration command message from the connected base station using the transceiver module and to register or remove the virtual UE on the basis of the connection reconfiguration command message.

Further, according to an embodiment of the present invention, the following may be commonly applied to the method by which a UE performing communication in an inter-vehicle communication system controls a virtual UE and the UE.

According to an embodiment of the present invention, connection may be performed on the basis of a representative ID of the UE, and the virtual UE may be registered or removed on the basis of a virtual UE index.

Here, unique virtual UE indexes may be assigned to virtual UEs registered with the UE, and the virtual UEs may respectively perform communication with the base station on the basis of the unique virtual UE indexes.

Further, according to an embodiment of the present invention, connection may refer to radio resource control (RRC) connection.

Further, according to an embodiment of the present invention, the method may further include transmitting at least one of information on the UE and information on a service provided by the UE to the base station.

Here, the base station may determine whether the virtual UE is registered or removed on the basis of the information received from the UE, and the connection reconfiguration command message may include information on determination of whether the virtual UE is registered or removed.

Further, according to an embodiment of the present invention, the UE may register the virtual UE when the connection reconfiguration command message indicates registration of the virtual UE and may remove the virtual UE when the connection reconfiguration command message indicates removal of the virtual UE.

Further, according to an embodiment of the present invention, the connection reconfiguration command message may further include control information required to be changed in the UE on the basis of registration or removal of the virtual UE.

Here, the control information may include at least one of information on a maximum value of ranks required to be simultaneously received per virtual UE, information on a method of receiving control information about the virtual UE, and information on a method of reporting the control information about the virtual UE.

Further, according to an embodiment of the present invention, the method may further include: a receiving a virtual UE measurement request from the base station; performing measurement with respect to virtual UEs on the basis of the received virtual UE measurement request; and reporting measurement results with respect to the virtual UEs to the base station.

Further, according to an embodiment of the present invention, when the UE reports measurement results with respect to a plurality of virtual UEs to the base station, each of the plurality of virtual UEs may directly report only measurement result thereof to the base station.

Further, according to an embodiment of the present invention, when the UE reports measurement results with respect to a plurality of virtual UEs to the base station, one of the plurality of virtual UEs may report information on measurement results with respect to the plurality of virtual UEs to the base station.

Advantageous Effects

The description can provide a method and device for performing communication using a virtual UE in an inter-vehicle communication system.

The description can provide a method by which a UE registers or removes a virtual UE under the control of a base station.

The description can provide a method of registering or removing a virtual UE without affecting a network configuration such as a bearer.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE

Figure 1:
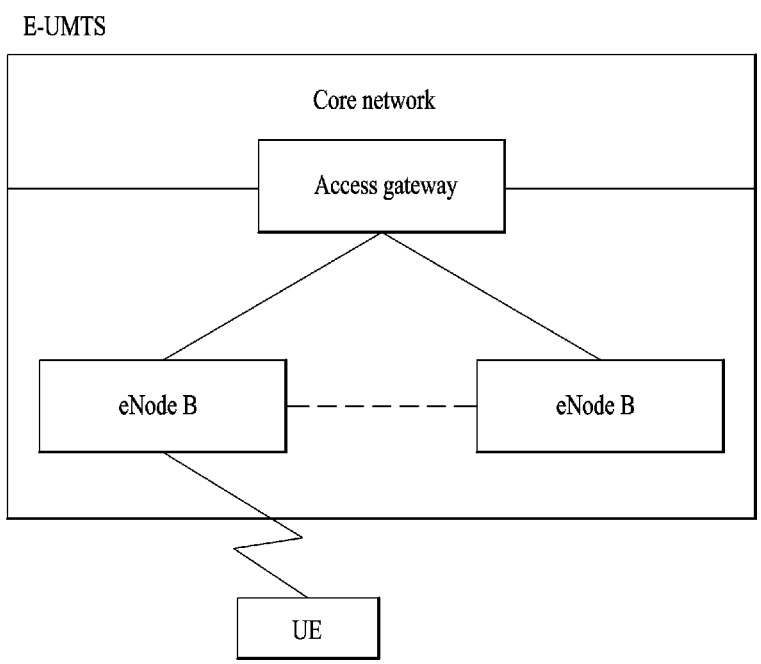
FIG. 1 is a diagram schematically illustrating a network structure of an E-UMTS as an exemplary radio communication system according to an embodiment of the present invention.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a 3rd Generation Partnership Project (3GPP) system, 3GPP Long Term Evolution (LTE) and LTE-Advanced (LTE-A) systems, and a 3GPP2 system. That is, the steps or portions, which are not described in order to make the technical spirit of the present invention clear, may be supported by the above documents. In addition, all the terms disclosed in the present document may be described by the above standard documents.

The following technology can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

Figure 2:
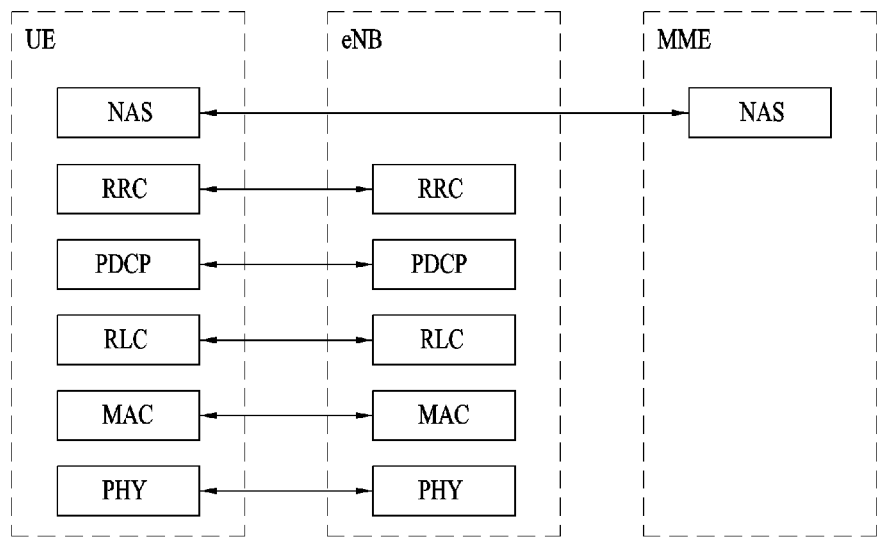
FIG. 2 is a diagram illustrating structures of a control plane and a user plane of a radio interface protocol between a UE and an E-UTRAN based on the 3GPP radio access network specification according to an embodiment of the present invention.
Figure 2:
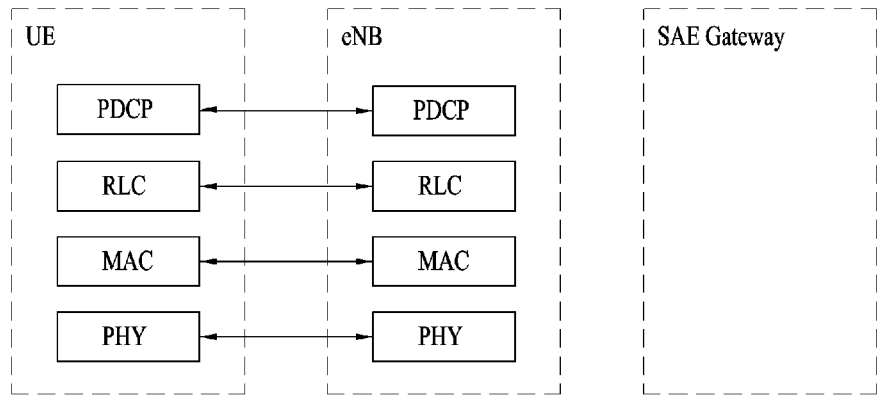

FIG. 2 is a diagram illustrating structures of a control plane and a user plane of a radio interface protocol between a UE and an E-UTRAN based on the 3GPP radio access network specification according to an embodiment of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH)

carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
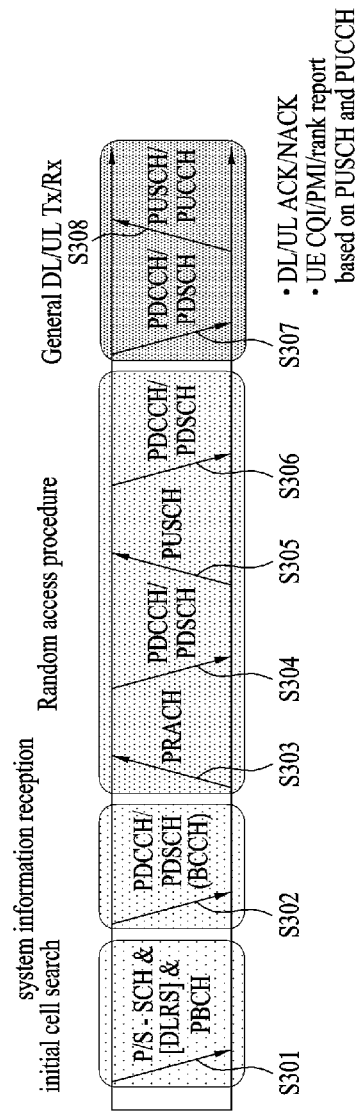
FIG. 3 is a diagram illustrating physical channels used in a 3GPP system and a general signal transmission method using the same according to an embodiment of the present invention.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
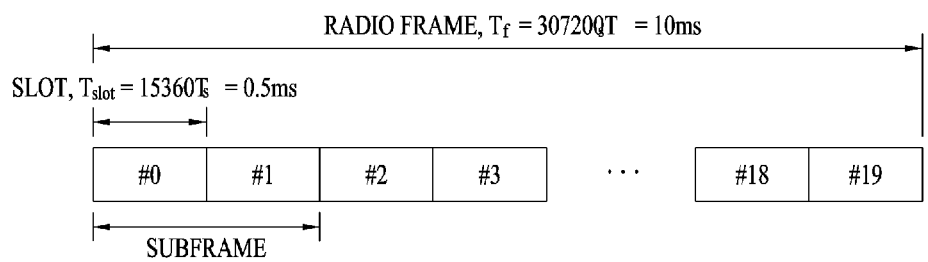
FIG. 4 is a diagram illustrating the structure of a radio frame used in an LTE system according to an embodiment of the present invention.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and $Ts=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
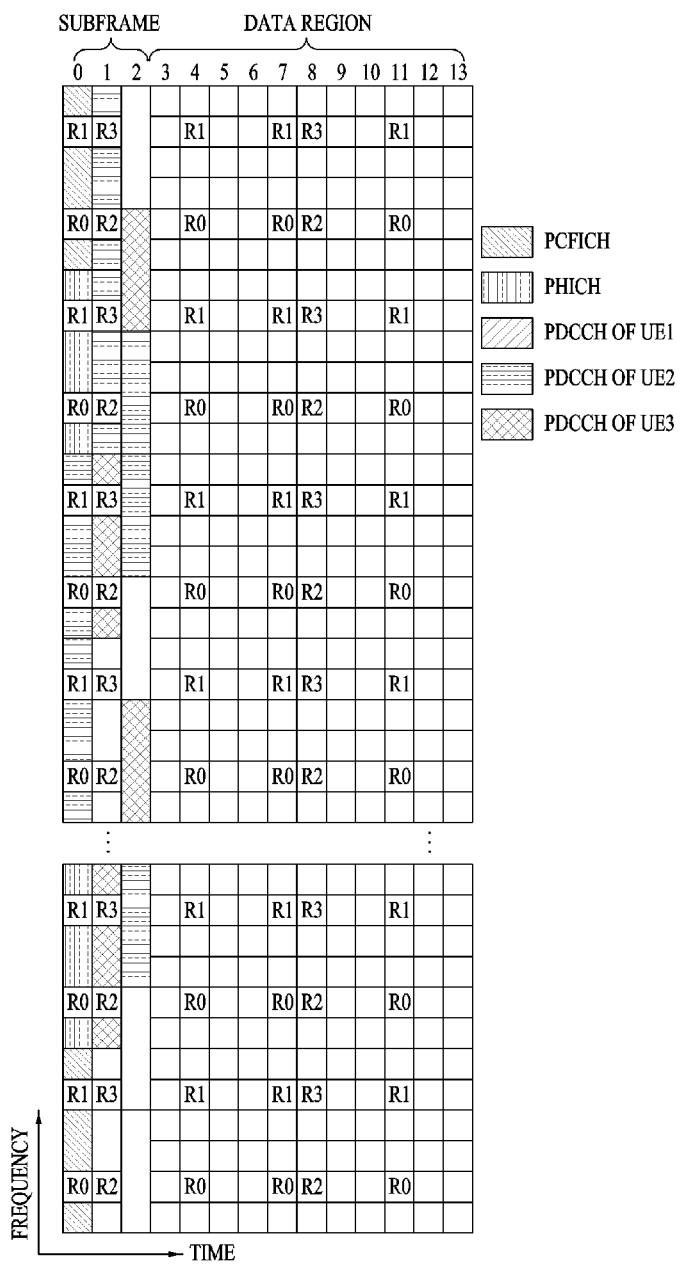
FIG. 5 is a diagram showing the structure of a downlink radio frame used in an LTE system according to an embodiment of the present invention.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
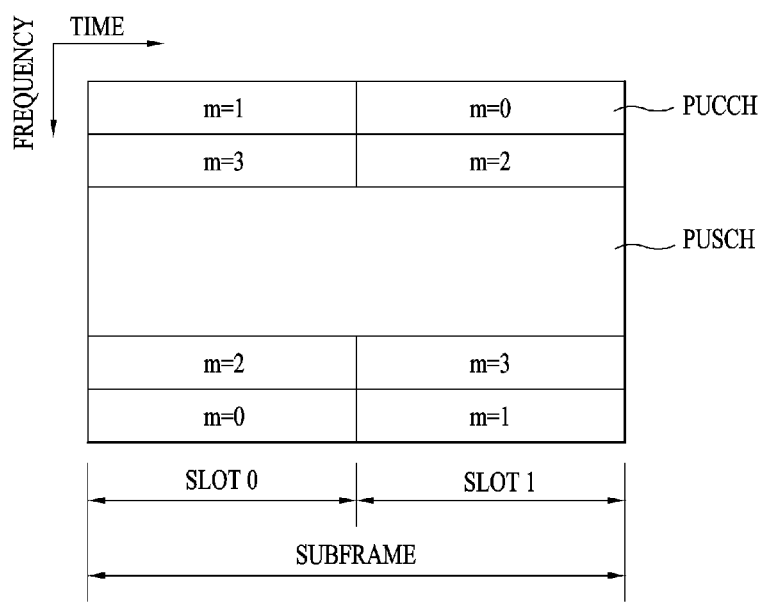
FIG. 6 is a diagram showing the structure of an uplink radio frame used in an LTE system according to an embodiment of the present invention.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
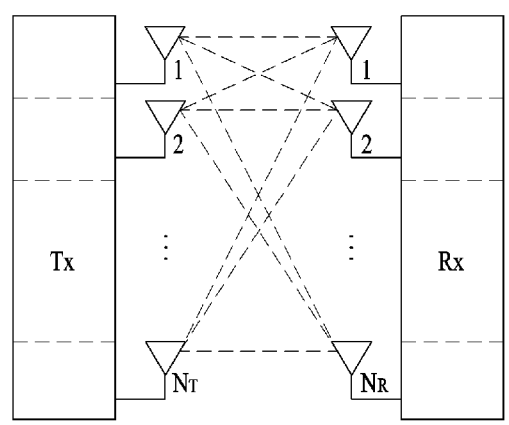
FIG. 7 is a diagram showing the structure of a general multiple input multiple output (MIMO) communication system according to an embodiment of the present invention.

FIG. 7 is a diagram showing the structure of a general multiple input multiple output (MIMO) communication system according to an embodiment of the present invention.

MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 7 illustrates the configuration of a typical MIMO communication system. A transmitter has NT transmit (Tx) antennas and a receiver has NR receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas, as indicated by Equation 1. Ri is the smaller of NT and NR.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that NT Tx antennas and NR Rx antennas are present as illustrated in FIG. 7. Regarding a transmission signal, up to NT pieces of information can be transmitted through the NT Tx antennas, as expressed as the vector of Equation 2 below.

$$s = [s_1, s_2, \ldots, s_{N_T}]^T \quad \text{[Equation 2]}$$

Individual pieces of the transmission information $s_1$, $s_2$, ..., $s_{N_T}$ may have different transmit powers. If the individual transmit powers are denoted by $P_1, P_2, \ldots, P_{N_T}$, respectively, then the transmission power-controlled transmission information may be given as shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T. \quad \text{[Equation 3]}$$

The transmission power-controlled transmission information vector $\hat{s}$ may be expressed as shown in Equation 4 below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix functions to appropriately distribute the transmission information to individual antennas according to transmission channel states, etc. The transmission signals $x_1, x_2, \ldots, x_{N_T}$ are represented as a vector X, as shown in Equation 5 below. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as shown in Equation 6 below.

$$\text{rank}(H) \leq \min(N_T, N_R)$$ [Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is expressed as shown in Equation 7 below.

$$\text{\# of streams} \leq \text{rank}(H) \leq \min(N_T, N_R)$$ [Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wide-band PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1 W2)$$ [Equation 8]

In Equation 1, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix.}$$ [Equation 9]

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r \text{ columns}} \text{(if rank} = r\text{),}$$

where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown in Equation 10 below.

$$W1(i) * W2(j) = \begin{bmatrix} X_i(k) \\ \alpha_j X_i(k) \end{bmatrix}$$ [Equation 10]

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. As a representative example, a discrete Fourier transform (DFT) matrix may be used.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinafter, a vehicular communication system based on the above-described wireless communication system will be described.

Vehicular MIMO (Multi-Input Multi-Output) system which includes large-size antenna array installed in vehicle to provide good quality services in high-mobility moving situations through large array gain and relays received data from central unit (CU) of a vehicle to in-vehicle passengers is considered to provide efficient vehicle communication as mentioned above.

When a large-sized antenna array is installed outside the vehicle and the wireless communication between the eNB and the passengers in the vehicle is relayed via the antenna array, degradation of communication performance due to penetration loss having an average of about 20 dB may be prevented. Further, large array gain can be obtained by using more antennas than personal portable communication devices, and Rx diversity can also be easily obtained since the antennas exists with large distances.

By the above-mentioned features, communication services can be provided with relatively good quality without additional investments in infrastructures. Despite these advantages, the large antenna array has never installed outside vehicles. It is not easy to install the large antenna array outside vehicles since vehicles are expensive assets than personal communication devices, are not easy to enhance & upgrade, and require design concept, aerodynamic structure, etc. Accordingly, it is not easy to install a large-sized antenna array, which restricts vehicle design in terms of aesthetics/aerodynamics, in a vehicle.

Figure 8:
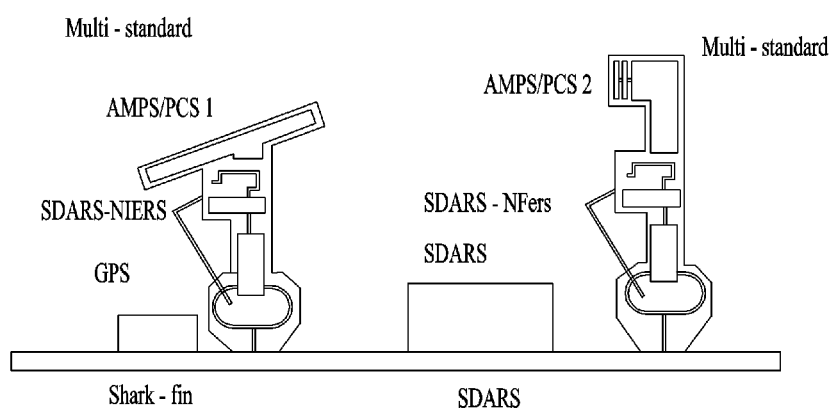
FIG. 8 illustrates a structure of a shark antenna.

To remove visual discomfort of antenna arrays, vehicle manufacturers use combinational antenna which has worse performance than single antenna. FIG. 8 illustrates a structure of a shark antenna.

As can be seen from FIG. 8, a shark antenna consists of 4 or more antennas supporting different bandwidths/services. But, the shark antenna is not enough to provide high quality communications, since the shark antenna has worse performance than single antenna, as said before.

Thus, embodiments of the present invention consider distributed antenna array system (DAS) which implements arrayed antenna system with a plurality of antennas, not a single antenna to solve the problem of shark antenna and the space constraints of large antenna array.

Figure 9:
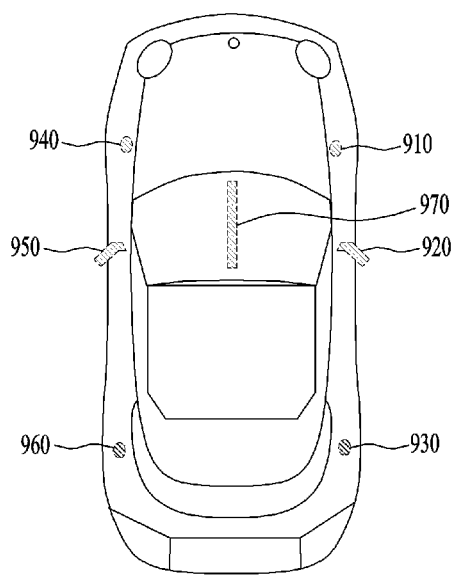
FIG. 9 is a diagram showing a vehicle including a plurality of antenna arrays according to an embodiment of the present invention.
Figure 9:
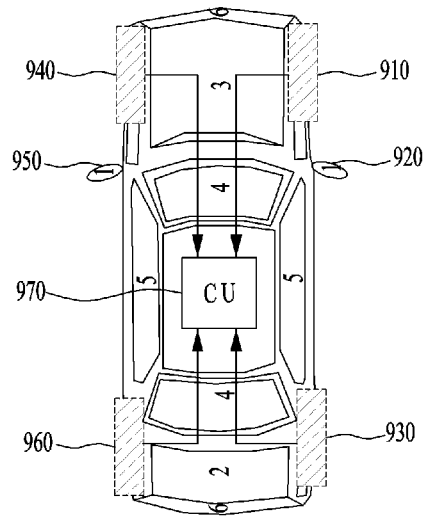

FIG. 9 is a diagram showing a vehicle including a plurality of antenna arrays according to an embodiment of the present invention. The number of uses of the above-described wireless communication system and service categories using the wireless communication system have increased. At this time, unlike an existing static service, need to provide high data throughput, high data rate and high quality of service (QoS) to user equipments (UEs) or users moving at a high speed has increased.

For example, a wireless communication system needs to support wireless services having good quality to moving UEs when a plurality of UEs or users (hereinafter, collectively referred to as a UE) desires to view multimedia content while using public transportation or when a plurality of UEs of passengers riding in a personal vehicle traveling on an expressway uses different wireless communication services.

At this time, for example, referring to FIG. 9, a vehicle may include a plurality of antennas 910, 920, 930, 940, 950 and 960 mounted therein. At this time, the locations and number of the plurality of antennas 910, 920, 930, 940, 950 and 960 may be changed according to vehicle design. At this time, the below-described configuration is equally applicable even when the locations and number of the plurality of antennas 910, 920, 930, 940, 950 and 960 mounted in the vehicle are changed, and the present invention is not limited to the below-described embodiments. That is, the present invention is applicable to antennas having various shapes and radiation patterns according to the locations of the plurality of antennas 910, 920, 930, 940, 950 and 960.

At this time, signals for distributed antenna units (DUs) of the vehicle may be controlled through a central unit (CU) 970. That is, the CU 970 of the vehicle may control the signals for the DUs 910, 920, 930, 940, 950 and 960 mounted in the vehicle to receive a signal from a base station while maximizing reception diversity and to prevent wireless connection between the base station and the vehicle in a state in which the vehicle moves at a high speed. That is, the vehicle may be a UE having a plurality of antennas or a relay for relaying a signal. The vehicle may provide a service having good quality to a plurality of UEs located in the vehicle through control and relay of the signal received through the CU 970.

Figure 10:
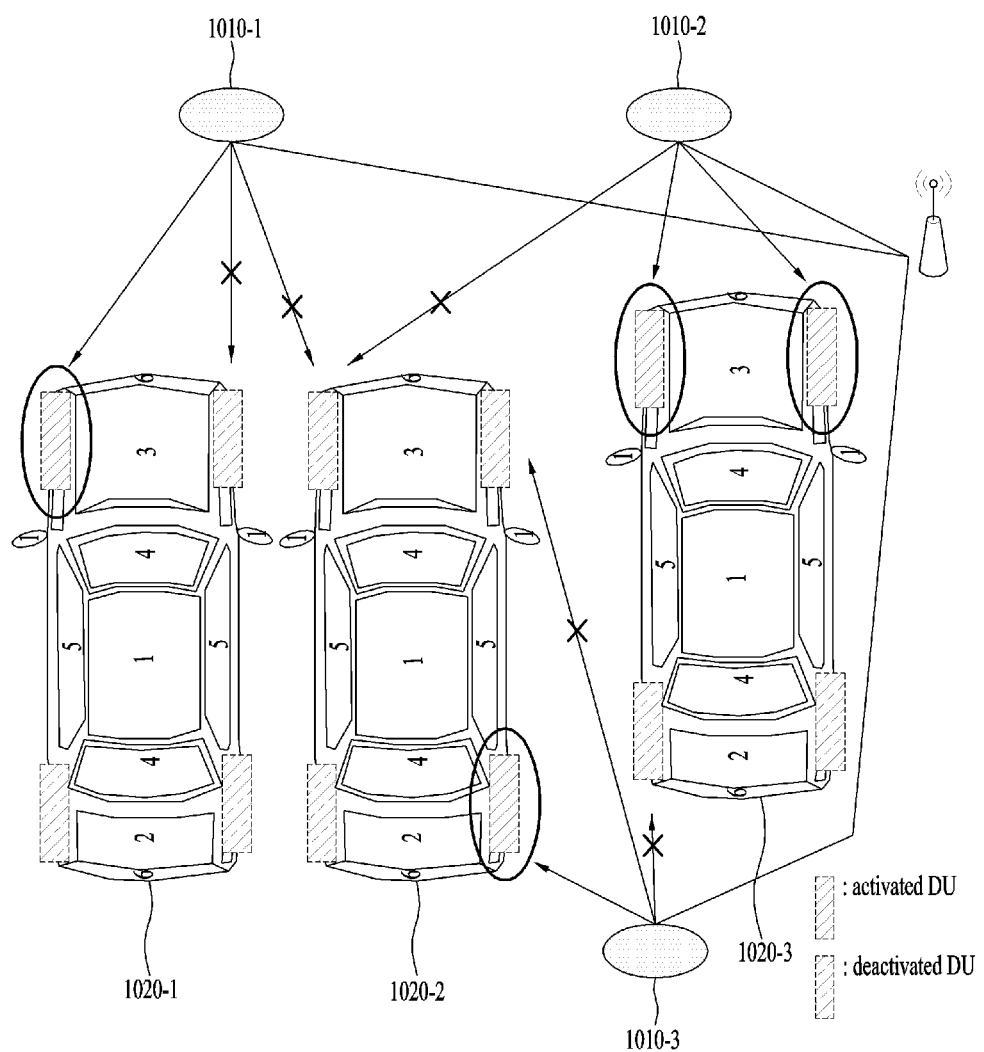
FIG. 10 is a diagram showing a method of selecting a distributed antenna unit (DU) in a state in which a plurality of vehicles is concentrated, according to an embodiment of the present invention.

FIG. 10 is a diagram showing a method of selecting a distributed antenna unit (DU) in a state in which a plurality of vehicles is concentrated, according to an embodiment of the present invention.

As described above, a vehicle may include a plurality of DUs and a CU 870 for controlling the DUs. At this time, a plurality of vehicles 1020-1, 1020-2 and 1020-3 may be concentrated in a narrow area. For example, the plurality of vehicles 1020-1, 1020-2 and 920-3 may be concentrated in a narrow area upon city driving or upon a traffic jam. At this time, if the plurality of vehicles 1020-1, 1020-2 and 1020-3 is concentrated, it may be difficult to distinguish between beams for the DUs of the vehicles due to beam sharpness. For example, if a plurality of vehicles is close to each other, the DU located at the right side of the first vehicle 1020-1 may be adjacent to the DUs located at the left side of the second vehicle 1020-2 and thus the beams for these DUs may not be easily distinguished. That is, since DUs located adjacent to each other receive signals undergoing similar channel environments, a plurality of DUs may be likely to receive the same beam or not to receive a signal due to blocking of obstacles.

Accordingly, activation of the DUs deployed in the plurality of vehicles 1020-1, 1020-2 and 1020-3 needs to be controlled. More specifically, the vehicles 1020-1, 1020-2 and 1020-3 may selectively control activation or deactivation of the DUs based on the density of neighboring vehicles. For example, when a beam transmitted from a first base station 1010-1 to a first vehicle 1020-1 is received, the first vehicle 1020-1 may activate only the DUs located at the left side of the first vehicle 1020-1 and deactivate the remaining DUs of the first vehicle 1020-1, to be distinguished from the adjacent second vehicle 1020-2. At this time, for example, the first vehicle 1020-1 may determine whether vehicles are concentrated using a position information reception unit (e.g., a GPS) or a proximity sensor. In addition, for example, whether the DUs are deactivated may be determined based on a threshold value based on density of vehicles. At this time, a threshold value may be a criterion value for determining activation or deactivation. That is, a criterion for determining whether the vehicles 1020-1, 1020-2 and 1020-3 are concentrated may be changed and is not limited to the above-described embodiment.

In addition, the third vehicle 1020-3 may activate two DUs located at the front side of the third vehicle 1020-3 in order to receive the beam from the second base station 1010-2. That is, the vehicles 1020-1, 1020-2 and 1020-3 may selectively activate/deactivate the DUs thereof to distinguish the beam received through the activated DUs thereof from the beams capable of being received by adjacent vehicles. Therefore, beams passing through independent paths experiencing different clusters are received, thereby improving beam reception performance.

As described above, a plurality of DUs may be installed in a vehicle and activation/deactivation of each DU may be controlled. That is, the vehicle can operate on the basis of DAS.

Figure 11:
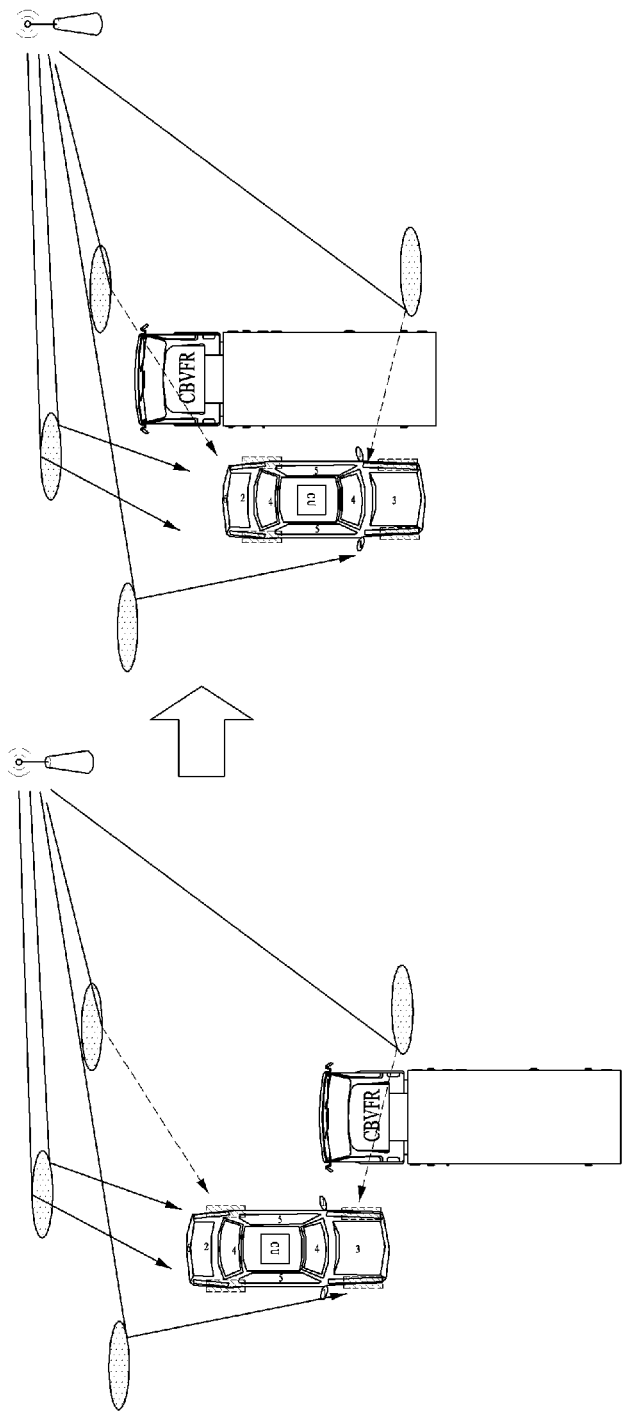
FIG. 11 illustrates advantages of the distributed antenna system when ray-blocks are present.

FIG. 11 illustrates advantages of the distributed antenna system when ray-blocks are present.

FIG. 11 shows the reason why the DAS has advantageous in preventing link failures compared to traditional antenna array.

In vehicle communications, when an obstacle (e.g., large size vehicle, such as a truck) moves with similar speed to the vehicle and Rx signal is received from the obstacle-presenting side, there might be communication failure for a relatively long time period. However, with DAS shown in FIG. 11, Rx signals received from the network can have a plurality of different paths, thereby communication failure problem caused by the obstacle can be solved.

In FIG. 11, a device at a network end that transmits signals to UEs located in a vehicle may be an eNB of a conventional communication system, and may be a roadside device or a roadside unit that supports vehicular communication. As shown in FIG. 11, a signal transmitted from the device at the network end may be directly received by the vehicle, or may be received via a path of reflection from a specific object.

As described above, DAS is advantageous in securing connection stability, and a high data rate may be supported by obtaining a large antenna gain through DAS. Accordingly, DAS is well suited for vehicle communication systems.

However, the DAS has a burden of installing a lossless cable between the CU and a plurality of antennas. If each of the distributed antennas (or sub-antennas) merely serves to receive an RF baseband signal and deliver the same to the CU, cables for a high frequency band for sharing the RF signal should be installed between the antennas and the CU. These cables are not only costly, but also sensitive to physical stimuli such as movement and impact. Thus, it is difficult to implement these cables. In addition, it is also very difficult to restore a fault at the reception end.

In order to address this issue, DAS is preferably implemented in a manner that a modem operating independently is installed in each of the distributed antennas (or sub-array antennas) or that a part of the reception operation is independently performed on the distributed antennas, and the baseband signal, the soft value, and the digital processing process are shared between the distributed antennas and the CU.

As described, DAS is a proper array solution for a communication system for vehicles to overcome communication performance reduction in case of a ray-block and link failure occurrence, and to enhance receiving power gain through large array antenna in DAS. However, to obtain practical gain in mobile communication system through the antenna structure, proper access management method should also be applied.

More specifically, a conventional connection control method for personal communication equipment using a single antenna array may be a reception power-based connection control method which selects a base station most suitable to provide a service to UEs by comparing reception powers of cell search reference signals transmitted from base stations. This reception power-based connection control method may not provide a function of considering abundant rays in order to prevent performance deterioration due to ray-block, a function of comparing reception diversity gains, etc.

Figure 12:
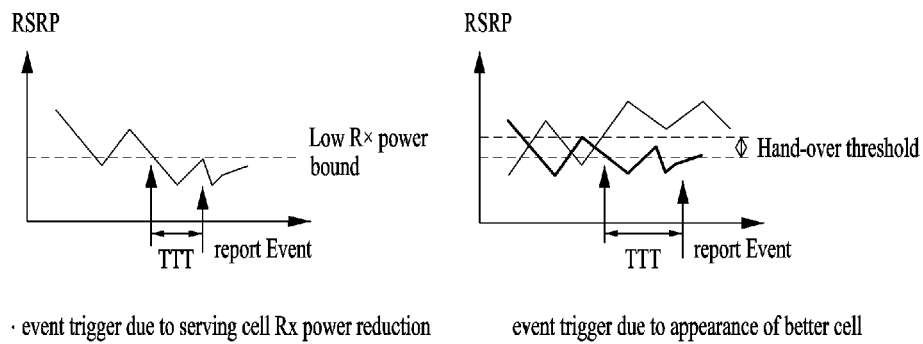
FIG. 12 illustrates a diagram of Radio Resource Monitoring (RRM) measurement scheme for selecting eNB/cell.

FIG. 12 illustrates a diagram of Radio Resource Monitoring (RRM) measurement scheme for selecting eNB/cell.

In FIG. 12, to request an eNB/cell change to serving eNB by a UE, 'event' notifying the eNB/cell change is needed should be triggered. The 'event' is triggered when 1) received power of cell search reference signal from the serving cell is lower than a predetermined value and access point change to another eNB/cell is required to be considered, 2) cell search reference signal from another cell is received with higher power than the signal from the serving cell for a predetermined time period and thus it is determined that an eNB/cell which is more proper than the serving eNB/cell exists, or 3) the case 1) and the case 2) simultaneously and/or sequentially occur. When the 'event' is triggered, the network or the serving cell requests to the UE for more detailed channel situation measurements and report, performs/commands serving cell change, or maintains the current state due to various network factors which is not recognized by the UE (e.g., traffic balancing).

Figure 13:
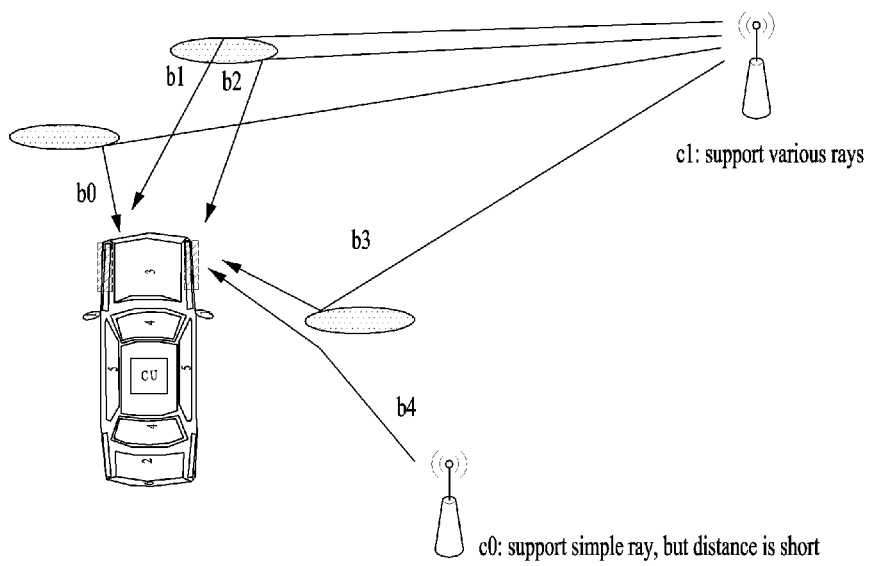
FIG. 13 illustrates a problem of traditional cell selection method based on Rx power and also illustrates one exemplary embodiment of cell selection method according to the present invention.

FIG. 13 illustrates a problem of traditional cell selection method based on Rx power and also illustrates one exemplary embodiment of cell selection method according to the present invention.

In FIG. 13, vehicle performs measurement for a cell search reference signal from a cell 1 (c0) and reports a result to the c0, since the vehicle is close to the c0. However, when an obstacle exists between the vehicle and the c0, a link failure may happen since only one ray is received from the c0. On the contrary, a cell 2 (c1) can support a communication with various rays, even though the c1 cannot provide signals to the vehicle with high receiving power since the vehicle is far away from the c1. Thus, link between the vehicle can be stably maintained even the obstacle is present. When the vehicle moves in high speed, a cell selection should be performed by considering information with regard to the 'ray distribution'.

To generate proper Tx beams in a Tx end, channel information should be identified and a gain when generated beams are used should also be specifically measured. The channel information can be obtained by transmitting additional pilot signal from the Tx end to the Rx end. However, in current communication system, the Rx end measures channel and reports it back to Tx end in a format of Channel State Information (CSI). The channel information can be defined as a combination of sub-channels generated among a plurality of Tx/Rx antennas, and thus the Channel information gets more complex as the number of Tx/Rx antennas in MIMO system is increased.

Meanwhile, method for reporting the channel information can be divided into 1) explicit CSI reporting and 2) implicit CSI reporting. Explicit CSI reporting is a scheme that Rx end reports information as close as possible to the measured value without any interpreting the measured channel. In explicit CSI reporting, quantization for the MIMO channel and/or SVD (Singular Value Decomposition) operation are also applied to reduce signaling overhead.

Implicit CSI reporting is a scheme that Rx end reports information needed to generate beams at the Tx end instead of the measured channel, by interpreting the measured channel information itself. The implicit CSI reporting scheme is used in current mobile communication system because of the small signaling overhead required in CSI reporting.

According to large antenna array implemented as in-vehicle DAS, the vehicle can obtain high link stability and high data rate since high rank downlink transmission occurs with high probability than conventional personal mobile communication device. To support high rank downlink transmission, a plurality of transmission beams should be precisely controlled when the plurality of transmission beams are simultaneously transmitted. Since traditional standards are focused on transmission beam control with low rank transmission, there is a burden of correcting the current standard specifications. Specifically, the current standard specifications should be changed in view of the followings:

1) when supporting high rank transmission/reception, more various beam measurement and generation should be supported (in current standards, one rank 8 precoder and 16 rank 2 precoders are defined)

2) user data rate (throughput) should be guaranteed even when a part of codeword fails to be transmitted and/or a part of connections is blocked, in case of a simultaneous transmission of a plurality of codeword (transport block)

To support the above-mentioned two points, new codebook should be newly defined, and structural of a downlink MIMO transmission end should also be changed to increase the number of codewords simultaneously transmitted. And, when a structure of a codebook which is used for CSI measurement for high rank transmission is changed, resources for CSI reporting are also increased. Therefore, another device to which high-rank reception is not essential may also increase feedback overhead, which may result in degradation of overall frequency efficiency. This issue should be addressed. Alternatively, system performance may be degraded as the number of devices capable of simultaneously accessing a network is reduced due to lack of capacity of an uplink control channel. This issue should also be considered.

As described above, Each of DUs of in-vehicle DAS structure is physically distributed apart from each other, and is designed to possess different radiation patterns according to its position of the vehicle due to metal surface characteristics of the vehicle. And, by a reflect and a propagation at the metal surface, channels between eNB and each of the DUs have low correlation and are relatively independent than channels of conventional linear antenna array structure. By using this, each of DUs or a part of DUs can be grouped so that grouped DUs operate as if they are one user equipment (or device) independent from other not-grouped DUs. That is, DUs belonging to one vehicle are reported to network entry as if they are one single independent UE, and high rank transmission/reception is performed through the one single independent UE. Hereinafter, the above-mentioned scheme is called 'virtual UE scheme', and the one single independent UE which consists of one or more DUs is called 'virtual UE (VUE)'. By designating the VUE, problems of standardization and implementation can be resolved and following advantages can be obtained at the same time.

1) By designating VUE, QoS management does not have to be performed for each of the DUs and can be controlled throughout one single bearer: some entry of the network but eNB can recognize the vehicle composed of multiple VUEs as one single user.

2) Multi-user channel is established between the eNB and the vehicle, and the eNB proceeds to control transmissions to each of DUs of the VUE and receptions of feedback from each of DUs of the VUE. Thus, other conventional devices are not affected by the virtual UE scheme.

Figure 14:
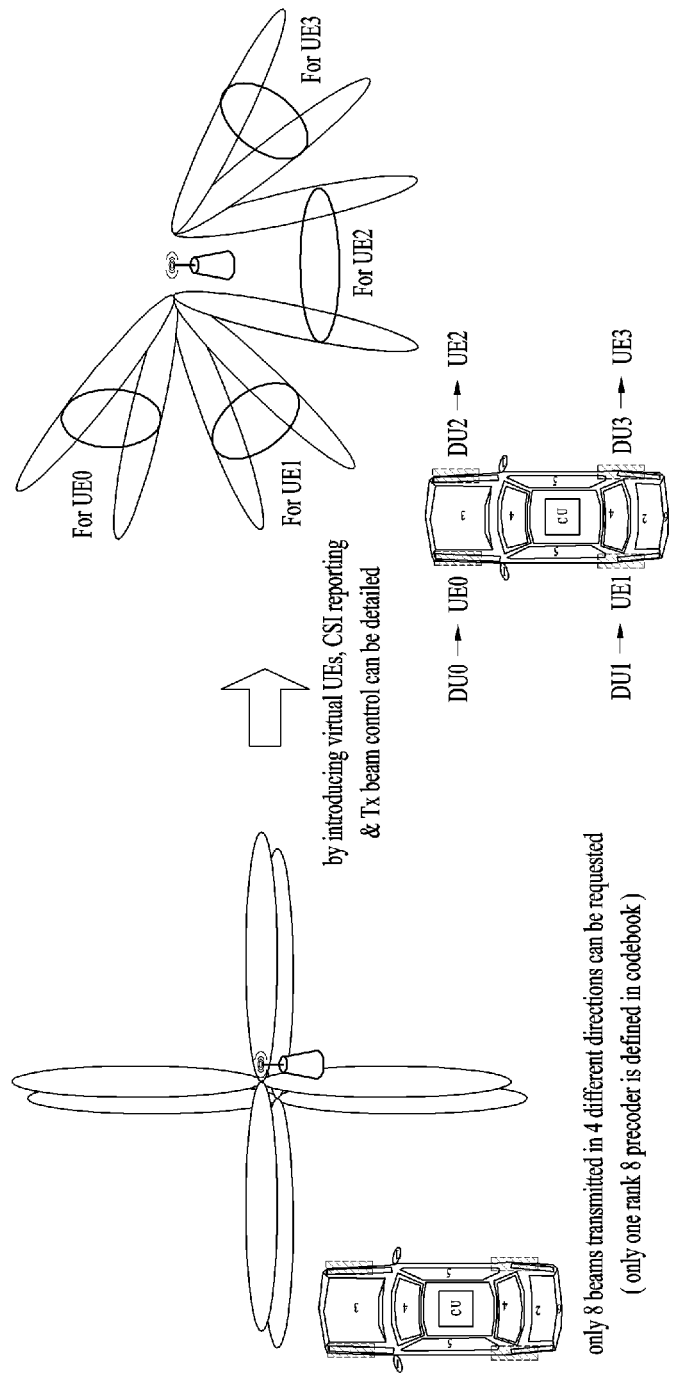
FIG. 14 is a diagram of detailed Tx beam control by introducing virtual User Equipment (VUE).

FIG. 14 is a diagram of detailed Tx beam control by introducing virtual User Equipment (VUE).

As can be seen from FIG. 14, DU0, DU1, DU2, and DU3 are designated as 4 VUEs of UE0, UE1, UE2, and UE3, respectively. Before considering virtual UE scheme, the vehicle is considered as one single UE by the eNB and only 8 different Tx beams can be used since only one rank 8 precoder is defined in the codebook. On the contrary, as per the virtual UE scheme, 2 Tx beams can be allocated for each of 4 VUEs and one of 16 different Tx beam combinations can be selected and used for each of 4 VUEs.

Figure 15:
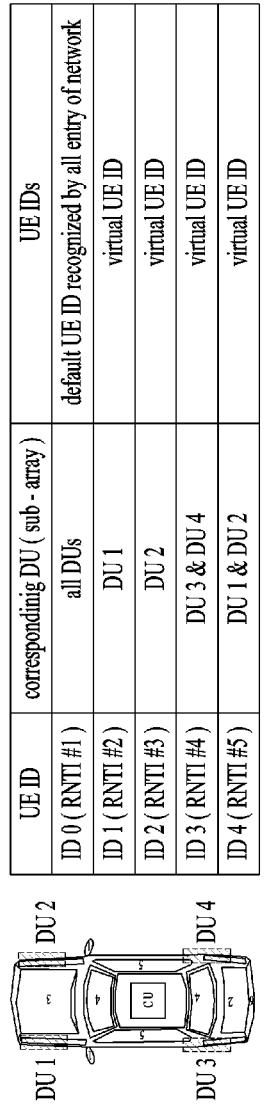
FIG. 15 shows an exemplary embodiment of defining a plurality of virtual UEs and corresponding UE IDs.

FIG. 15 shows an exemplary embodiment of defining a plurality of virtual UEs and corresponding UE IDs. FIG. 15 shows a case that a vehicle is configured with 4 DUs and one CU connecting the 4 DUs.

The vehicle can define a VUE with a combination of one or more DUs. Each of VUEs can be configured with different combination of DUs and physical characteristics of each of the VUE are configured differently each other. Or, each of VUEs can be configured to share one or more DUs so that Multiple Access Interference (MAI) caused by MU-MIMO access can be efficiently controlled. Or, each of VUEs can be configured to include different number of DUs, thereby Rx performance/complexity can be set differently for the each of VUEs. And, specific combinations of DUs (i.e., specific VUE) can be registered as a default user.

Here, one VUE can be differed from other VUEs in at least one of physical layer ID, cell specific UE ID (RNTI), and Rx antenna indication, etc. That is, different indication is allocated for each of VUEs so that eNB or a part of entry of a network recognizes the differences between target (or, destination) of data transmission.

Hereinafter, a proposed method for connecting a network in DAS by using the aforementioned virtual UE scheme is described. In the proposed embodiment, "substantial UE (SUE)" is defined first. When a plurality of VUEs is registered with/connected to a network, a part of network entries (for example, an eNB or an MME) can individually recognize the plurality of VUEs. On the contrary, the other network entries do not distinguish between VUEs but merely recognize the same as one SUE. In other words, the proposed embodiment method can be understood as a network transparent UE scheme in which only some network entries recognize presence of a user and the other network entries fail to recognize presence of the user.

Hereinafter, the 'SUE' is defined as one of the following:

1) A UE defined with one global UE ID
2) A UE performing communication to support one service
3) A UE firstly establishing connection with the network among different combinations of DUs
4) A UE recognized as one device by network entries (except for an eNB or MME which recognizes that the virtual UE scheme is applied)

On the contrary, "VUE" is defined as a UE establishing connection with eNB through an additional access procedure (e.g., a random access procedure or RACH procedure) with a combination including one or more DUs. By allowing the SUE to add/register connections of a plurality of UEs (i.e., VUEs), the proposed embodiment may ensure performance of a new UE requiring high performance such as a vehicle, with high rank transmission, an increased number of codewords that can be received simultaneously, and enhanced degree of scheduling freedom (resource allocation).

The proposed embodiment is intended to support the vehicle with high rank transmission by using the virtual UE scheme without influencing the operation of the existing mobile communication system supporting conventional devices. To this end, an embodiment using a virtual UE scheme which does not affect network configurations such as a bearer will be described.

With respect to the above-described component, a combination of one or more DUs is referred to as a virtual UE but the configuration is not limited to this term. That is, a component configured as a combination of one or more DUs in DAS and performing connection with a base station through an additional connection procedure while being discriminated from other DUs in DAS may be equally referred to as the aforementioned virtual UE.

In addition, at least one of a UE defined using a single global UE IE, a UE performing communication for supporting a single service, a UE initially configuring connection to a network in a combination of other DUs and a UE recognized as a device by a network entity may be referred to as the aforementioned substantial UE, but the UE is not limited to the aforementioned term and components performing the same function may be equally referred to as the substantial UE.

Figure 16:
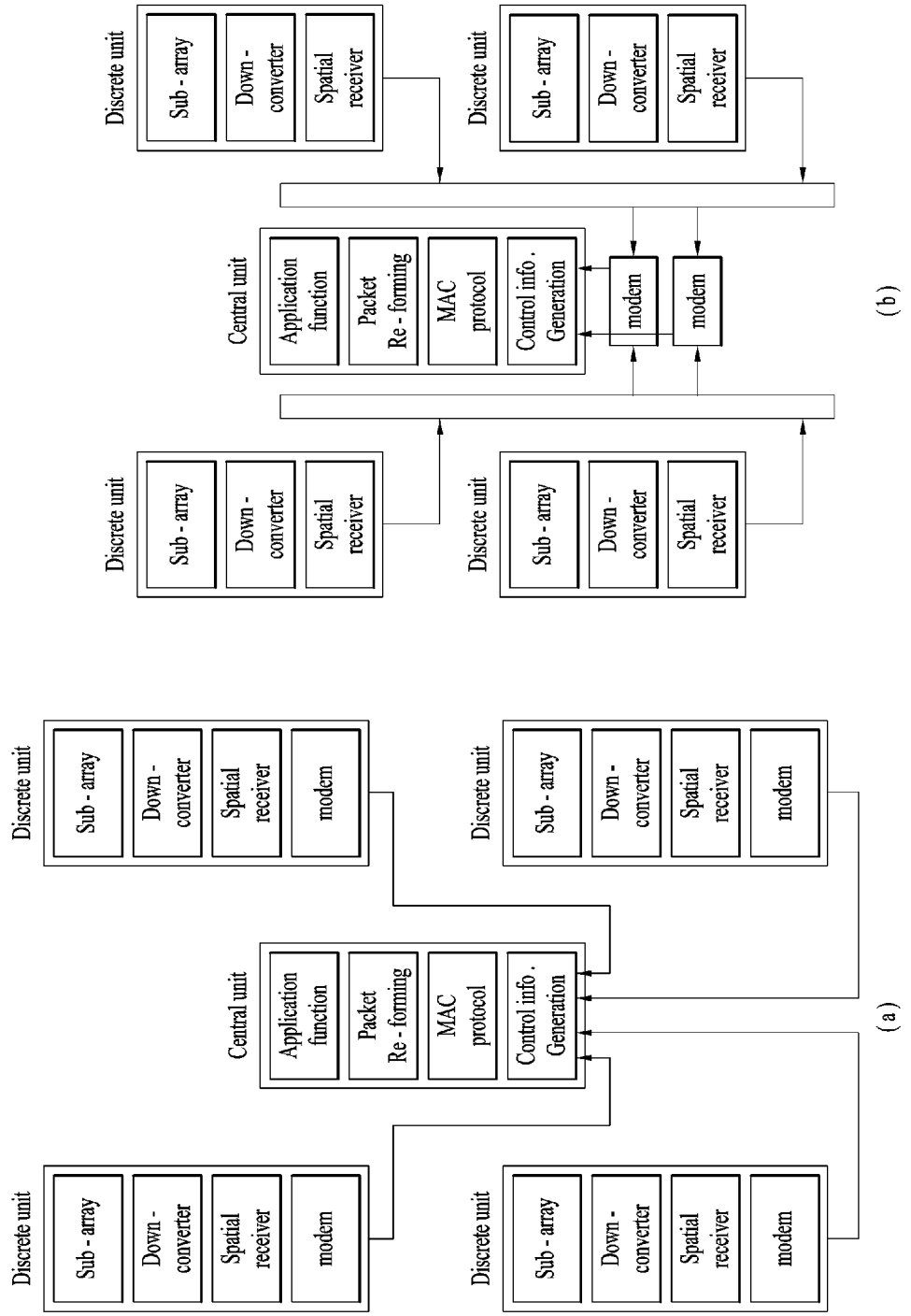
FIG. 16 is a block diagram of a device supporting a virtual UE scheme.

FIG. 16 is a block diagram of a device supporting a virtual UE scheme.

One exemplary embodiment of a device supporting the aforementioned virtual UE scheme is shown in FIG. 16. In FIG. 16, the device (or UE) consists of one CU determining content of control information to be transmitted to an eNB and a method of reporting the control information and a plurality of DUs receiving a downlink signal. Further, the device may include one or more modems which primarily demodulate the received information, and a connection between the DUs and the modem may be fixed, as shown on the left side of FIG. 16, or may be floating, as shown on the right side of FIG. 16. Not only does the CU generate control information, but it also performs physical layer or higher layer operations such as reconstructing serving packets from the received information and executing applications. In FIG. 16, each of DUs is not a mere antenna, but may perform a decoding procedure, a MIMO-related procedure, a CSI measurement/reporting procedure, and the like.

Figure 17:
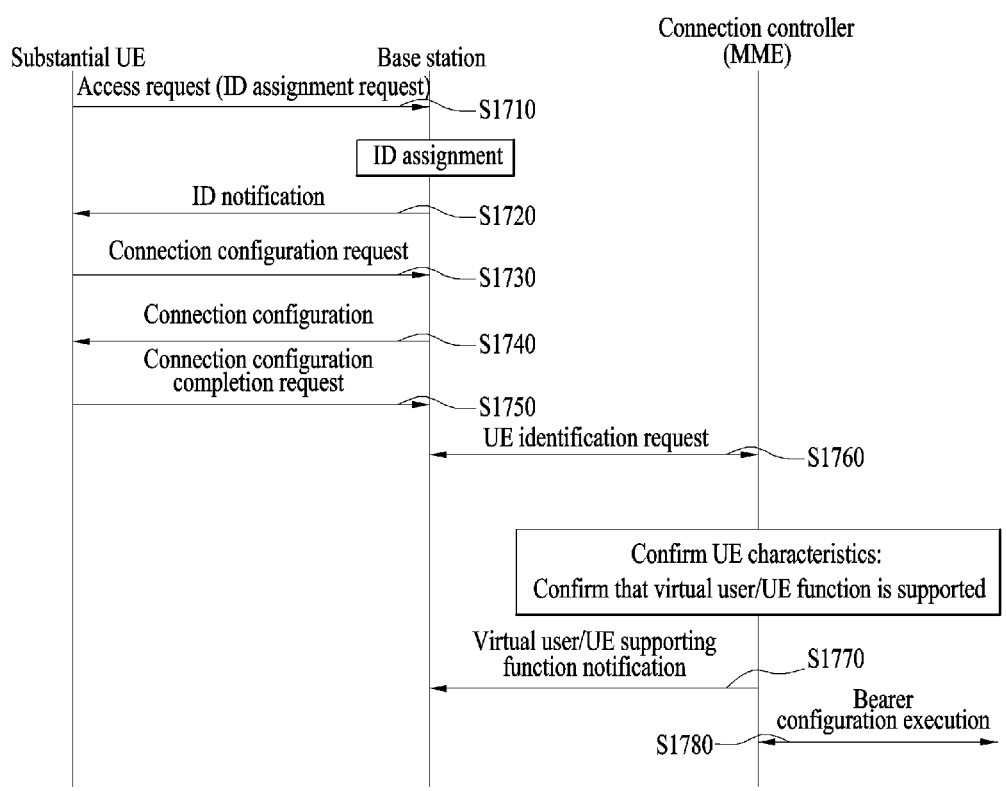
FIG. 17 illustrates a method by which a UE configures connection with a base station.

FIG. 17 shows a method by which a UE configures connection with a base station.

As described above, a UE may support a substantial UE and a virtual UE. Here, the substantial UE may correspond to at least one of a UE defined using a single global UE IE, a UE performing communication for supporting a single service, a UE initially configuring connection to a network in a combination of other DUs and a UE recognized as a device by a network entity, as described above. For example, whether a UE is a substantial UE may be determined on the basis of the representative ID of the UE. Here, the representative ID of the UE may be an indicator indicating that the UE is the substantial UE and is not limited to a specific indication method.

In addition, a virtual UE may be set by a DU or a DU set, as described above, and may be identified by a virtual UE index. Here, a virtual UE index may be an indicator indicating a virtual UE and is not limited to a specific indication method.

Further, although the terms "vehicle" and "UE" are used interchangeably in the above description, the following description is based on UE. That is, a substantial vehicle may be a substantial UE and a virtual vehicle may be a virtual UE.

Here, the description can be equally applied to a vehicle including a DU, a UE and devices including a plurality of antennas and capable of selecting activation or deactivation of the antennas, as described above. A UE may include the aforementioned components in the following description and is not limited to the following embodiments.

In an embodiment of the description, a substantial UE and a virtual UE may be supported as a device including a plurality of antennas and activating/deactivating each antenna, as described above. The same applies to a device including a plurality of separated antennas and is not limited to the above-described embodiments.

Although the term "UE" is used in the following description, the UE may be applied to a vehicle and other devices.

Here, registration (or addition) and removal of a virtual UE (or virtual vehicle) performed by a UE (or vehicle) may be controlled by a base station. For example, upon determining that the virtual UE needs to be added or removed on the basis of information per UE (substantial UE) and information per service, the base station may configure connection between the UE and the base station and notify the UE of configuration of connection. For example, connection may refer to radio resource control (RRC) connection in conventional wireless communication systems. For example, when the base station initially registers a UE (or vehicle), the UE may secure system information (SI) necessary to connect to the base station and then send a request for registration or connection to the base station. Then, the UE may be registered with the base station through a procedure of exchanging signals with the base station, and when registration is completed, secure a communication available state through a detailed connection configuration procedure for performing communication with the base station. For example, a method of registering or removing a virtual UE for the UE (or substantial UE) that has secured a communication available state through the above-described operation will be described below. Through this method, the UE can control registration or removal of a virtual UE according to determination and notification of the base station without using a complicated procedure.

More specifically, a UE connected to the base station may newly register a virtual UE or notify the base station of disconnection of some of previously registered virtual UEs through a connection reconfiguration command from the base station. Here, connection may refer to a state in which a logical path or a logical channel through which a UE and a base station can perform wireless communication is formed by adjusting and sharing communication parameter values for performing wireless communication between the UE and the base station. For example, an RRC connected state in the conventional wireless communication systems may correspond to the aforementioned connected state.

In an embodiment, referring to FIG. 17, a UE may transmit an access request to a base station (S1710). Here, the access request of the UE may be an ID assignment request. For example, an ID requested by the UE may be an ID of a substantial UE. That is, the ID may be an ID used to recognize all UEs as a single substantial UE. In addition, the requested ID may be a representative ID, for example, and is not limited to the above-described embodiment.

Thereafter, the base station may assign an ID to the UE and notify the UE of information on the assigned ID (S1720). Here, the ID notified of the base station may be a representative ID of the UE, for example. Then, the UE may transmit a connection configuration request to the base station (S1730). The base station may configure connection with the UE upon reception of the connection configuration request (S1740) and the UE may notify the base station of a report on completion of connection configuration (S1750). Here, the report on completion of connection configuration may be a report on ACK/NACK, for example, and is not limited to the above-described embodiment.

After connection configuration between the base station and the UE, the base station may send a request for information on whether a virtual UE function is supported to a higher network entity (S1760). That is, the base station may send a request for identification or authentication of the UE to the higher network entity without directly sending a request for information on whether the virtual UE function is supported to the UE. Then, the higher network entity may check characteristics of the UE through identification or authentication of the UE. Here, the characteristics of the UE may include whether the UE supports the virtual UE function, for example. Here, the higher network entity may notify the base station of information on whether the UE supports the virtual UE function (S1770). Accordingly, the base station can confirm whether the UE supports the virtual UE function. Then, the higher network entity may perform bearer configuration (S1780).

For the aforementioned procedures, whether the UE supports the virtual UE function may be checked using identification or authentication information as the representative ID of the UE or information on the substantial UE. That is, checking whether the UE supports the virtual UE function may be performed on the basis of the representative ID of the UE as a substantial UE among the UE, the base station and the higher network entity.

Furthermore, the base station can acquire information on whether the UE supports a virtual UE through the higher network entity instead of directly receiving the information from the UE, as described above. Accordingly, the information on whether the UE supports a virtual UE is omitted from the viewpoint of the UE and thus overhead can be reduced.

Figure 18:
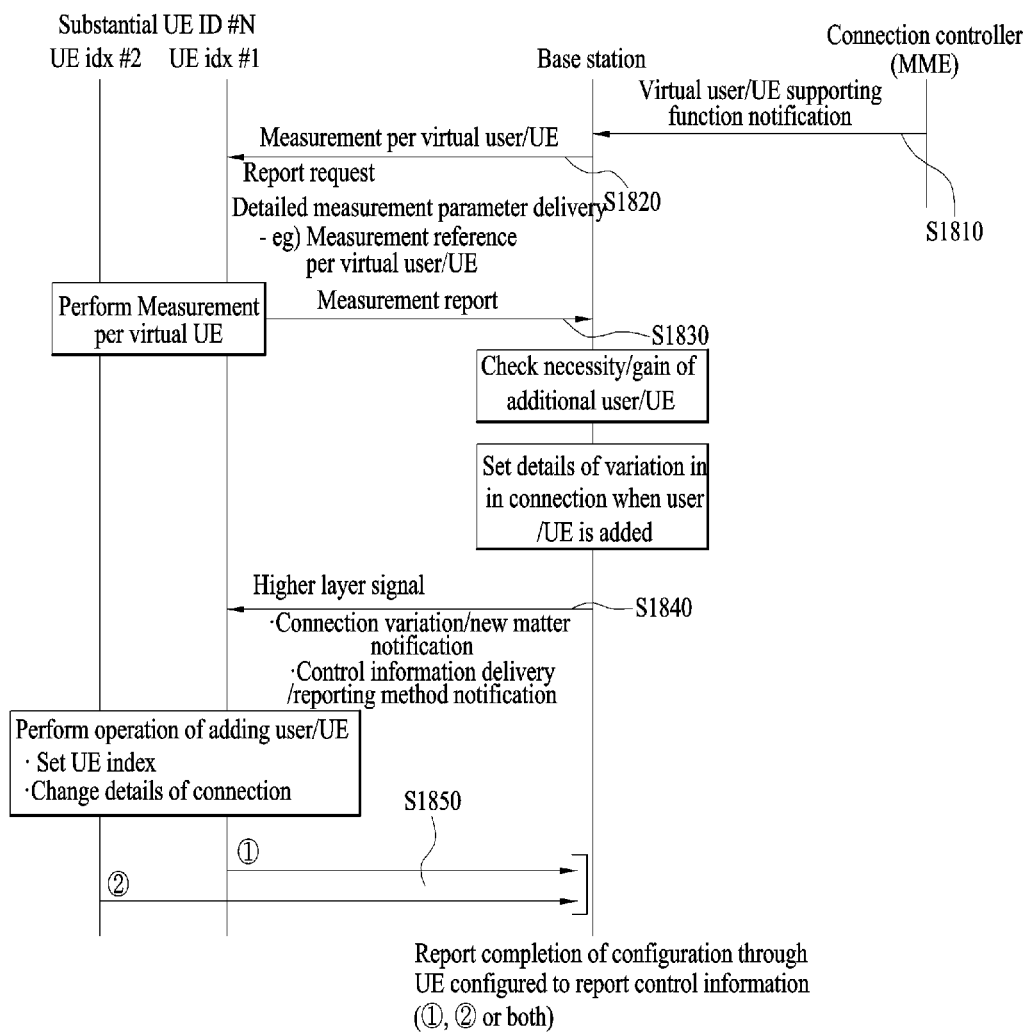
FIG. 18 shows a method of registering or removing a virtual UE.

FIG. 18 shows a method of registering or removing a virtual UE.

Upon connection configuration between a UE and a base station, the UE may receive a connection reconfiguration command message from the base station. Here, the UE may register (or add) or remove a virtual UE on the basis of the connection reconfiguration command message, for example. That is, the connection reconfiguration command message may include information on registration or removal of the virtual UE.

Here, a procedure of registering or removing the virtual UE may be performed on the basis of the index of the virtual UE, for example. Each virtual UE registered with respect to a substantial UE may be assigned a unique virtual UE index. That is, when the UE registers a virtual UE, a unique virtual UE index may be assigned to the registered virtual UE.

That is, when the UE and the base station perform connection, connection may be performed on the basis of the representative ID of the UE as a substantial UE. On the other hand, in registration or removal of virtual UEs, additional indexes are assigned to the virtual UEs in the UE and a registration or removal procedure can be performed in a state in which the virtual UEs are discriminated from one another.

In addition, the UE may transmit at least one of information on the UE and information on a service provided by the UE to the base station in order to register or remove the virtual UE, for example. That is, the UE may transmit information thereon to the base station. Here, the base station may determine whether the virtual UE is registered or removed on the basis of the information received from the UE. In this case, the base station may include information on whether the virtual UE is registered or removed in a connection reconfiguration command and transmit the connection reconfiguration command to the UE. The UE may register or remove the virtual UE upon reception of the connection reconfiguration command message. That is, the UE may register the virtual UE when the connection reconfiguration command message indicates registration of the virtual UE. On the contrary, the UE may remove the virtual UE when the connection reconfiguration command message indicates removal of the virtual UE.

In addition, the connection reconfiguration command message may further include control information that needs to be changed by the UE on the basis of registration or removal of the virtual UE. That is, the connection reconfiguration command message may further include parameter information that needs to be changed by the UE on the basis of registration or removal of the virtual UE. Here, the control information may include at least one of information on a maximum value of ranks that need to be simultaneously received per virtual UE, information on a method of receiving control information about virtual UEs, and information on a method of reporting the control information about virtual UEs, for example. That is, the connection reconfiguration command message may include information that needs to be changed or notified by the UE on the basis of registration or removal of a virtual UE and is not limited to the above-described embodiment.

In a more specific embodiment, referring to FIG. 18, the base station may receive virtual UE supporting function information from a higher network entity upon connection configuration with respect to a vehicle and the base station (S1810). Then, the base station may transmit a measurement report request message per virtual UE to a UE (S1820). That is, the base station may transmit the measurement report request message per virtual UE to a UE that supports the virtual UE function for additional information necessary to determine whether a virtual UE is registered or removed.

Here, the measurement report request message per virtual UE is transmitted to the UE such that measurement per virtual UE is reported, for example. Here, the UE may perform measurement for each virtual UE. For example, measurement may refer to channel information measurement per virtual UE. In addition, information that needs to be measured may be measured on the basis of information on the UE and information on a service provided by the UE and measurement is not limited to the above-described embodiment.

Here, the UE may perform measurement per virtual UE and then report measurement information to the base station (S1830). In this case, a method of reporting measurement per virtual UE may be set in different manners, for example.

More specifically, each virtual UE may directly perform measurement and directly report only measurement information thereof to the base station. That is, each virtual UE registered with the UE can independently report measurement information thereof to the base station. For example, each virtual UE can transmit measurement information thereof to the base station on the basis of a unique virtual UE index assigned thereto. The base station may acquire measurement information on each virtual UE on the basis of virtual UE indexes. In another example, one or more of a plurality of virtual UEs may simultaneously report measurement information of the plurality of virtual UEs to the base station. When one or more virtual UEs simultaneously report measurement information of the plurality of virtual UEs to the base station, for example, the measurement information of the plurality of UEs may be reported on the basis of the representative ID of the UE (or substantial UE). That is, the base station may confirm that the target UE simultaneously transmits the measurement information on the plurality of virtual UEs on the basis of the representative ID. For example, the measurement information on the plurality of virtual UEs may be information set on the basis of virtual UE indexes of the respective virtual UEs. Here, one or more virtual UEs may transmit measurement information on the virtual UEs based on the virtual UE indexes to the base station, and the base station may acquire the measurement information on the respective virtual UEs on the basis of the virtual UE indexes.

That is, virtual UEs can be identified by virtual UE indexes in the UE (substantial UE), which is not limited to the above-described embodiment.

The base station may determine the necessity to register (or add) or remove a virtual UE upon acquisition of the measurement information on the virtual UEs. For example, the base station may determine whether a virtual UE is registered or removed by comparing the measurement information with a threshold value.

Here, upon determining that a virtual UE needs to be added, the base station may check variation in detailed setting information about configuration of connection with the UE. In this case, the base station may provide information about variation in connection configuration and new matters to the UE through a higher layer signal (e.g., an RRC signal) (S1840). Here, the aforementioned connection reconfiguration request message may be transmitted as the higher layer signal. Then, the UE may perform registration of the virtual UE on the basis of the received higher layer signal or the connection reconfiguration request message. Here, the UE may assign a unique virtual UE index to the registered virtual UE. In addition, the UE may change detailed parameters or other pieces of information about connection configuration on the basis of control information included in the higher layer signal or the connection reconfiguration request message. Here, information representing completion of connection establishment may be reported to the base station through a virtual UE configured to report control information among virtual UEs of the UE (or substantial UE) (S1850). In another example, each virtual UE may report information representing completion of connection establishment to the base station, which is not limited to the above-described embodiment.

Upon determining that a virtual UE needs to be removed, the base station may check variation in the detailed setting information about configuration of connection with the UE. Here, the base station may provide information on variation in connection configuration and the virtual UE to be removed through a higher layer signal (e.g., an RRC signal). Then, the UE may remove the virtual UE on the basis of the received higher layer signal or connection reconfiguration request message. Here, the UE may remove the virtual UE index corresponding to the removed virtual UE and maintain the removed virtual UE index as reserved information. In addition, the UE may change detailed parameters or other pieces of information about connection configuration on the basis of control information included in the higher layer signal or the connection reconfiguration request message. Here, information representing completion of connection establishment may be reported to the base station through a virtual UE configured to report control information among the virtual UEs of the UE (or substantial UE). In another example, each virtual UE may report information representing completion of connection establishment to the base station, which is not limited to the above-described embodiment.

Further, information on an operation that needs to be changed by the UE for data reception or transmission on the basis of registration and removal of a virtual UE may include information on a maximum rank value. That is, the information may include information necessary for data exchange with the base station. Furthermore, the information may include information on a method of reporting control information about each virtual UE (e.g., a method of reporting HARQ ACK/NACK), for example.

Here, the UE directly receives information about registration or removal of a virtual UE from the base station through the above-described method and thus may not require an additional virtual UE registration operation such as a random access (RA) request. Accordingly, the base station can check an added virtual UE through a relationship with a registered UE (or substantial UE) instead of assigning a unique ID to the added virtual UE. That is, an unnecessary procedure can be omitted by exchanging information through virtual UE indexes that can be shared or understood between the UE (or substantial UE) and the base station, and thus overhead can be reduced.

Figure 19:
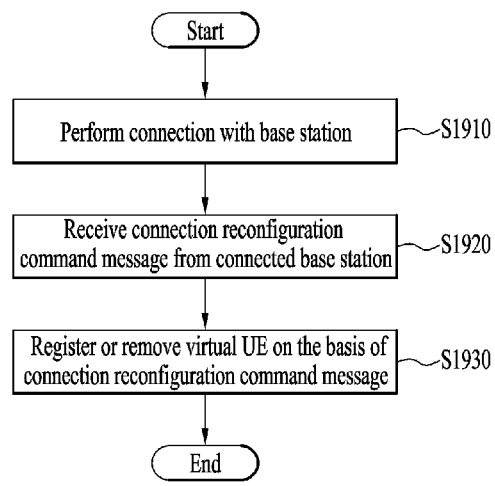
FIG. 19 is a flowchart illustrating a method of registering or removing a virtual UE according to an embodiment of the present description.

FIG. 19 is a flowchart illustrating a method of registering or removing a virtual UE according to an embodiment of the present invention.

A UE (or vehicle) may perform connection with a base station (S1910). Here, connection may refer to a state in which the base station and the UE can perform communication through a logical path or a logical channel, as described above with reference to FIGS. 8 to 18. For example, connection may refer to RRC connection in a wireless communication system.

Subsequently, the UE may receive a connection reconfiguration command message from the connected base station (S1920). Here, the connection reconfiguration command message may include information on a virtual UE determined by the base station, as described above with reference to FIGS. 8 to 18. That is, the base station may determine whether a virtual UE with respect to the connected UE is registered or removed, include information on the determined virtual UE in the connection reconfiguration command message and transmit the connection reconfiguration command message to the UE. In addition, the connection reconfiguration command message may include control information changed in the UE on the basis of registration or removal of a virtual UE, as described above.

Then, the UE may perform registration or removal of the virtual UE on the basis of the connection reconfiguration command message (S1930). Here, when the base station includes the information on the determined virtual UE in the connection reconfiguration command message and transmit the connection reconfiguration command message, the UE may perform registration of the virtual UE, as described above with reference to FIGS. 8 to 19. Here, a unique virtual UE index may be assigned to the registered virtual UE. Upon completion of registration of the virtual UE, the UE may transmit registration completion information to the base station. Here, control information may be reported to the base station through a virtual UE configured to report the control information, among virtual UEs, for example. Further, each virtual UE may report control information to the base station, as described above. When the base station includes information about removal of the virtual UE in the connection reconfiguration command message and transmits the connection reconfiguration command message, the UE may remove the virtual UE, as described above.

Figure 20:
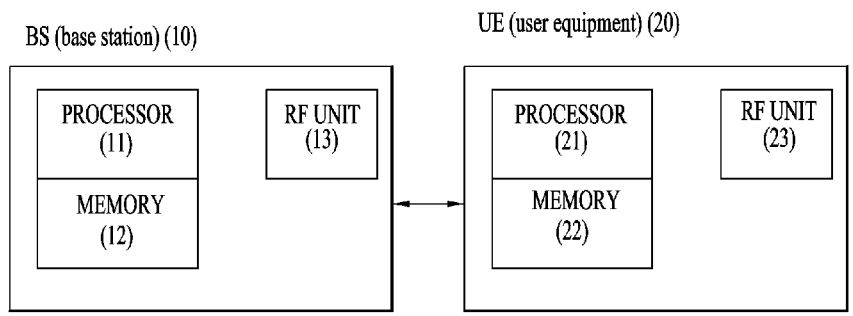
FIG. 20 is a block diagram showing a UE apparatus and a base station apparatus according to an embodiment of the present invention.

FIG. 20 is a block diagram showing a UE apparatus and a base station apparatus according to an embodiment of the present invention.

Although a UE is described as a component with respect to a wireless communication system in the following, the component may be a vehicle as described above.

The wireless communication system may include a base station 10 and at least one UE 20. At this time, on downlink, the base station 10 may be a transmission device and the UE 20 may be a reception device. In addition, on uplink, the UE 20 may be a transmission device and the base station 10 may be a reception device. At this time, the base station apparatus 10 may include a processor 11 for controlling units, a memory 12 for storing information and a radio frequency (RF) unit 13 for transmitting and receiving signals. At this time, the processor 11 of the base station apparatus 10 may perform the methods or procedures described above with reference to FIGS. 1 to 19. The memory 12 of the base station apparatus 10 may be connected to the processor 11 to store a variety of information controlled by the processor 11. In addition, the base station apparatus 10 may perform communication with an external device using the RF unit 13. At this time, the external device may be a UE apparatus. In addition, for example, the external device may be the above-described vehicle. In addition, for example, the external device may be a fixed apparatus or device, without being limited to the above-described embodiments. That is, the base station apparatus 10 may perform communication with another device as an external device, without being limited to the above-described embodiments.

In addition, the UE apparatus 20 may include a processor 21, a memory 22 and an RF unit 23. The processor 21 of the UE apparatus 20 may perform the methods or procedures described above with reference to FIGS. 1 to 19. The memory 22 of the UE apparatus 20 may be connected to the processor 21 to store a variety of information controlled by the processor 21. In addition, the UE apparatus 20 may perform communication with an external device using the RF unit 23. At this time, the external device may be a base station apparatus 10. In addition, for example, the external device may be the above-described vehicle. In addition, for example, the external device may be a fixed apparatus or device, without being limited to the above-described embodiments. That is, the UE apparatus 20 may perform communication with another device as an external device, without being limited to the above-described embodiments.

At this time, for example, the base station apparatus 10 and/or the UE apparatus 20 may include one or a plurality of antennas. At this time, for example, if at least one of the base station apparatus 10 and the UE apparatus 20 includes a plurality of antennas, the wireless communication system may be the above-described MIMO system.

In addition, for example, the above-mentioned UE apparatus 20 may be a structure corresponding to the above-mentioned vehicle. That is, the single vehicle may be a single UE apparatus 20, and respective constituent elements of the UE apparatus 20 may be contained in the vehicle as necessary.

The embodiments according to the present invention can be implemented by various means, for example, hardware, firmware, software, or combinations thereof.

In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

INDUSTRIAL APPLICABILITY

Although an example of applying a method of transmitting and receiving channel information in a vehicular communication system and an apparatus therefor to a 3GPP LTE system is described, the present invention is applicable to various wireless communication systems in addition to the 3GPP LTE system.

The invention claimed is:

1. A method by which a user equipment (UE) performing communication controls a virtual UE, the method comprising:
performing a connection with a base station (BS);
transmitting, to the BS, at least one of information on the UE and information on a service provided by the UE,
wherein the BS determines whether the virtual UE is registered or removed, based on the at least one of the information on the UE and the information on the service provided by the UE;
receiving, from the BS, a connection reconfiguration command message,
wherein the connection reconfiguration command message includes information on a determination by the BS of whether the virtual UE is registered or removed; and
registering or removing the virtual UE based on the information on the determination by the BS included in the connection reconfiguration command message.

2. The method according to claim 1, wherein the UE is identified based on a representative ID of the UE, and wherein the virtual UE is identified based on a virtual UE index allocated to the virtual UE.

3. The method according to claim 2, wherein the connection is performed by identifying the UE based on the representative ID of the UE, and
wherein the virtual UE is registered or removed by identifying the virtual UE based on the virtual UE index.

4. The method according to claim 1, wherein the connection refers to a radio resource control (RRC) connection.

5. The method according to claim 1, wherein the UE registers the virtual UE when the information on the determination by the BS included in the connection reconfiguration command message indicates registration of the virtual UE and removes the virtual UE when the information on the determination by the BS included in the connection reconfiguration command message indicates removal of the virtual UE.

6. The method according to claim 1, wherein the connection reconfiguration command message further includes control information required to be changed in the UE based on registration or removal of the virtual UE.

7. The method according to claim 6, wherein the control information includes at least one of information on a maximum value of ranks required to be simultaneously received per virtual UE, information on a method of receiving control information about the virtual UE, and information on a method of reporting the control information about the virtual UE.

8. A user equipment (UE) for performing communication by controlling a virtual UE, the UE comprising:
a transceiver configured to transmit and receive information with an external device; and
a processor,
wherein the processor is configured to:
perform a connection with a base station (BS),
control the transceiver to transmit, to the BS, at least one of information on the UE and information on a service provided by the UE,
wherein the BS determines whether the virtual UE is registered or removed, based on the at least one of the information on the UE and the information on the service provided by the UE,
control the transceiver to receive, from the BS, a connection reconfiguration command message,
wherein the connection reconfiguration command message includes information on a determination by the BS of whether the virtual UE is registered or removed, and
register or remove the virtual UE based on the information on the determination by the BS included in the connection reconfiguration command message.

9. A method by which a base station performs communication with a user equipment (UE) including a virtual UE, the method comprising:
performing a connection with the UE;
transmitting a UE identification request message to a higher network entity based on the connection;
receiving a virtual UE support function notification message from the network entity;
transmitting a virtual UE measurement report request message to the UE;
receiving a measurement report message including measurement information from the UE;
determining whether the virtual UE is registered or removed with respect to the UE based on the measurement report message by comparing the measurement information with a threshold value; and transmitting a connection reconfiguration command message including information on whether the virtual UE is registered or removed to the UE.

10. The method according to claim 9, wherein the measurement report message is individually received per virtual UE.

* * * * *